US012665198B2

(12) United States Patent
Saidi

(10) Patent No.: US 12,665,198 B2
(45) Date of Patent: Jun. 23, 2026

(54) COMPOSITIONS AND METHODS FOR PASSIVATION OF ELECTRODE BINDERS

(71) Applicant: Tesla, Inc., Austin, TX (US)

(72) Inventor: Mohammed-Yazid Saidi, La Mesa, CA (US)

(73) Assignee: Tesla, Inc., Austin, TX (US)

( * ) Notice: Subject to any disclaimer, the term of this patent is extended or adjusted under 35 U.S.C. 154(b) by 706 days.

(21) Appl. No.: 18/067,399

(22) Filed: Dec. 16, 2022

(65) Prior Publication Data

US 2023/0120795 A1     Apr. 20, 2023

Related U.S. Application Data

(62) Division of application No. 16/495,203, filed as application No. PCT/US2018/023395 on Mar. 20, 2018, now Pat. No. 11,545,667.

(60) Provisional application No. 62/474,231, filed on Mar. 21, 2017.

(51) Int. Cl.
| | |
|---|---|
| *H01M 4/62* | (2006.01) |
| *C08L 27/18* | (2006.01) |
| *H01G 11/06* | (2013.01) |
| *H01M 4/133* | (2010.01) |
| *H01M 4/139* | (2010.01) |

(Continued)

(52) U.S. Cl.
CPC ........... *H01M 4/623* (2013.01); *H01M 4/133* (2013.01); *H01M 4/139* (2013.01); *H01M 4/1393* (2013.01); *H01M 4/625* (2013.01); *H01M 10/0525* (2013.01); *C08L 27/18* (2013.01); *C08L 2203/16* (2013.01); *H01G 11/06* (2013.01)

(58) Field of Classification Search
CPC .............. H01M 4/624–626; H01M 4/622–623
See application file for complete search history.

(56) References Cited

U.S. PATENT DOCUMENTS

| | | | |
|---|---|---|---|
| 5,707,763 A | 1/1998 | Shimizu | |
| 11,545,667 B2 | 1/2023 | Saidi | |
| 2002/0146623 A1 | 10/2002 | Suzuki | |

(Continued)

FOREIGN PATENT DOCUMENTS

| | | |
|---|---|---|
| JP | 2015 082488 A | 4/2015 |
| KR | 1020130058054 | 6/2013 |

(Continued)

OTHER PUBLICATIONS

Wood et al., Aug. 29, 2017, Technical and economic analysis of solvent-based lithium-ion electrode drying with water and NMP, Drying Technology, 36(2):1-11.

(Continued)

*Primary Examiner* — Robert S Carrico
(74) *Attorney, Agent, or Firm* — Knobbe Martens Olson & Bear, LLP

(57) ABSTRACT

Passivation methods and compositions for electrode binders are disclosed. A coated binder particle for use in an electrode film of an energy storage device is provided. The coated binder particle can comprise a coating over the surface of a binder particle, wherein the coating provides ionic insulation to the binder particle. In some embodiments, the coating covers the entire surface of the binder particle. In still further embodiments, a coated binder particle in an energy storage device blocks ionic contact between the binder and an electrolyte.

22 Claims, 8 Drawing Sheets

(51) Int. Cl.
      *H01M 4/1393*       (2010.01)
      *H01M 10/0525*      (2010.01)

(56)             References Cited

U.S. PATENT DOCUMENTS

| | | |
|---|---|---|
| 2005/0266298 A1 | 12/2005 | Mitchell et al. |
| 2006/0146479 A1 | 7/2006 | Mitchell et al. |
| 2006/0204855 A1 | 9/2006 | Saruwatari |
| 2010/0014215 A1 | 1/2010 | Zhong et al. |
| 2013/0288111 A1* | 10/2013 | An ........................ H01M 4/625 |
| | | 429/188 |
| 2014/0030590 A1 | 1/2014 | Wang et al. |
| 2014/0098463 A1 | 4/2014 | Bendale et al. |
| 2014/0098464 A1 | 4/2014 | Bendale et al. |
| 2014/0098465 A1 | 4/2014 | Bendale et al. |
| 2014/0104752 A1 | 4/2014 | Bendale et al. |
| 2014/0368973 A1 | 12/2014 | Bouchard et al. |
| 2015/0072234 A1 | 3/2015 | Mitchell et al. |
| 2015/0280241 A1* | 10/2015 | Hara .................... H01M 4/668 |
| | | 429/233 |

FOREIGN PATENT DOCUMENTS

| | | |
|---|---|---|
| KR | 10-2014-0070407 | 6/2014 |
| KR | 1020160145034 | 12/2016 |

OTHER PUBLICATIONS

International Search Report for Application No. PCT/US2018/023395 dated May 28, 2018 in 41 pages.

\* cited by examiner

Coating material and binder particles

Rotor

Centrifugal force

Fixed press head

Rotation

FIG. 7

COMPOSITIONS AND METHODS FOR PASSIVATION OF ELECTRODE BINDERS

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57. This application claims the benefit of U.S. patent application Ser. No. 16/495,203, filed Sep. 18, 2019, which claims priority to PCT Application No. PCT/US2018/023395, filed Mar. 20, 2018, which claims the benefit of priority to U.S. Provisional Patent Application No. 62/474,231, filed Mar. 21, 2017. The entire disclosures of the aforementioned applications are expressly incorporated by reference in their entirety.

BACKGROUND

Field

The present invention relates generally to energy storage devices, and specifically to passivation methods and compositions for electrode binders for use in energy storage devices.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the operating voltage and temperature of energy storage devices, including capacitors and batteries, would be desirable for enhancing energy storage, increasing power capability, and broadening real-world use cases.

However, at higher operating voltages, the electrode binders within the electrode films of energy storage devices may undergo degradation processes that result in a reduction in performance, or in outright cell failure. Over the life of an energy storage device, deterioration of device performance may manifest as reduced storage capacity, capacitance fade, increased equivalent series resistance (ESR) of the device, self-discharge, pseudocapacity, and/or gas formation. Thus, there is a need for electrode binders having improved stability under elevated voltage and temperature conditions of operation.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In some embodiments, a coated binder particle for use in an electrode film of an energy storage device is provided. The coated binder particle can comprise a coating over the surface of a binder particle, wherein the coating provides ionic insulation to the binder particle. In some embodiments, the coating covers some, most, or substantially all of the entire surface of the binder particle. In still further embodiments, a coated binder particle, when implemented within an energy storage device, does not make ionic contact with an electrolyte, or has reduced contact with an electrolyte, relative to a binder particle which is not coated.

In some embodiments, an energy storage device comprising the coated binder particle is provided, wherein the energy storage device comprises an electrode film including the coated binder particle.

In some embodiments, a method for coating a binder particle for use in an electrode film of an energy storage device is provided. In some embodiments, the method can comprise selecting a binder, selecting a coating material, and coating the binder particles. The method can include fibrillizing the coated binder particles. Generally, the coating material is an ionic insulator. In some embodiments, the coating material is an electrical conductor.

In a first aspect, a method for fabricating an energy storage device is provided, comprising combining polymeric binder particles with an ionically insulating coating material, mixing the binder particles and the coating material to form coated binder particles such that the binder particles are not fibrillized during mixing, combining the coated binder particles with active material particles to form a first mixture, milling at least some of the first mixture to form an electrode film mixture; and calendering the electrode film mixture to form a free-standing electrode film.

In an embodiment of the first aspect, the polymeric binder particles comprise polytetrafluoroethylene (PTFE).

In an embodiment of the first aspect, the active material particles comprise graphite.

In an embodiment of the first aspect, the coated binder particles comprise composite particles of binder and coating material.

In an embodiment of the first aspect, the coating material comprises conductive carbon.

In an embodiment of the first aspect, the coating material comprises an electrically conductive material.

In an embodiment of the first aspect, mixing comprises milling.

In an embodiment of the first aspect, the milling is conducted in a mill comprising media.

In an embodiment of the first aspect, milling at least some of the first mixture is a high shear process at a shear velocity sufficient to fibrillize the binder particles.

In an embodiment of the first aspect, the high shear process comprises jet-milling.

In an embodiment of the first aspect, surface color of the binder particles is not visible to the naked eye following the mixing step.

In an embodiment of the first aspect, the coated binder particles do not aggregate.

In a second aspect, an electrode film is provided, comprising active material particles and fibrillized polymeric binder particles coated with a coating material, wherein the coating material is ionically insulating and electrically conductive, and wherein the fibrillized polymeric binder particles form a matrix within the electrode film such that the electrode film is self-supporting.

In an embodiment of the second aspect, the binder particles comprise polytetrafluoroethylene (PTFE).

In an embodiment of the second aspect, the active material comprises graphite.

In an embodiment of the second aspect, the binder particles form composite particles with the coating material.

In an embodiment of the second aspect, the coating material comprises conductive carbon.

In an embodiment of the second aspect, the binder particles comprise composite particles of PTFE and conductive carbon.

In an embodiment of the second aspect, an energy storage device is provided, wherein the energy storage device includes the electrode film.

In an embodiment of the second aspect, the energy storage device includes an electrolyte comprising lithium ions in contact with the electrode film.

In an embodiment of the second aspect, the binder particles are insulated from contact with the lithium ions.

In an embodiment of the second aspect, the energy storage device is a battery.

In a third aspect, a milling apparatus for coating a fibrillizable binder suitable for binding electrode active materials is provided, comprising a container forming an inner volume, and a media, fibrillizable binder particles and an ionically insulating coating material within the inner volume, wherein the media and container are configured to move relative to each other so as to coat the binder particles with the coating material to form coated binder particles.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 7 depicts a mixing apparatus that may be used in an embodiment of the coating process.

DETAILED DESCRIPTION

Various embodiments of methods and compositions for reducing electrode binder decomposition in energy storage devices are disclosed. An energy storage device as provided herein may include a binder as provided herein. Further, an energy storage device as provided herein may be constructed by a method as provided herein.

Fluorinated binders, and in particular polytetrafluoroethylene (PTFE) are binders commonly used in electrodes.

Such binders enable the manufacturing of self-standing films without the aid of a solvent. It has been found that, under some modes of operation of energy storage devices, such as at elevated voltages, electrochemical reactions of the electrode binder(s) may occur, which can lead to decomposition of the binder(s). It is believed that electrochemical decomposition of fluorinated polymers may occur in the presence of lithium ions. Lithium being an electropositive metal, it may act as a reductant, and may act as a reductant of PTFE. For example, under elevated voltages a fluorinated electrode binder may decompose to form fluoride salts, for example, lithium fluoride. This fluorinated binder degradation can cause chemical and physical changes in the binder. These changes can affect the structural integrity of the electrode, such as the electrode film, due to, for example, the reduced binding abilities of the binder. This degradation can also cause the active materials in the electrode to lose or reduce electrical and/or ionic contact. Additionally, the decomposition reaction can lead to loss of lithium ions from the electrode, reducing the energy or capacity of the energy storage device. Thus, the overall performance of the device may be reduced. Certain embodiments of energy storage devices provided herein can incorporate features to reduce decomposition of electrode binder materials during operation.

Without wishing to be bound by theory, it is thought that a PTFE binder in a graphite anode can undergo an electrochemical reaction at about 0.5 V vs. a reference $Li/Li^+$ electrode. It is thought that the decomposition mechanism includes reduction of $—CF_2—CF_2—$ units in the polymer to acetylenic units. The reaction is thought to proceed as follows:

$$—(CF_2—CF_2)_n— +4nLi^+ +4ne^- \rightarrow -(C\equiv C)_n— + 4nLiF$$

Figure 2:
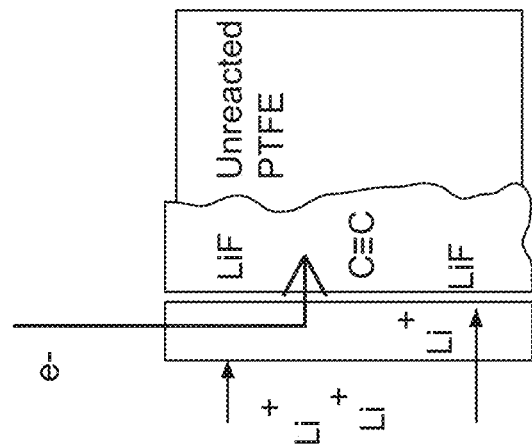
FIG. 2 depicts an energy storage device in which decomposition of polytetrafluoroethylene (PTFE) in the presence of lithium ions is taking place.
Figure 2:
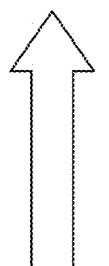
Figure 2:
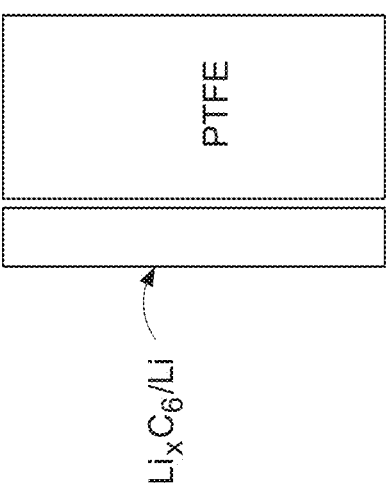
Figure 3:
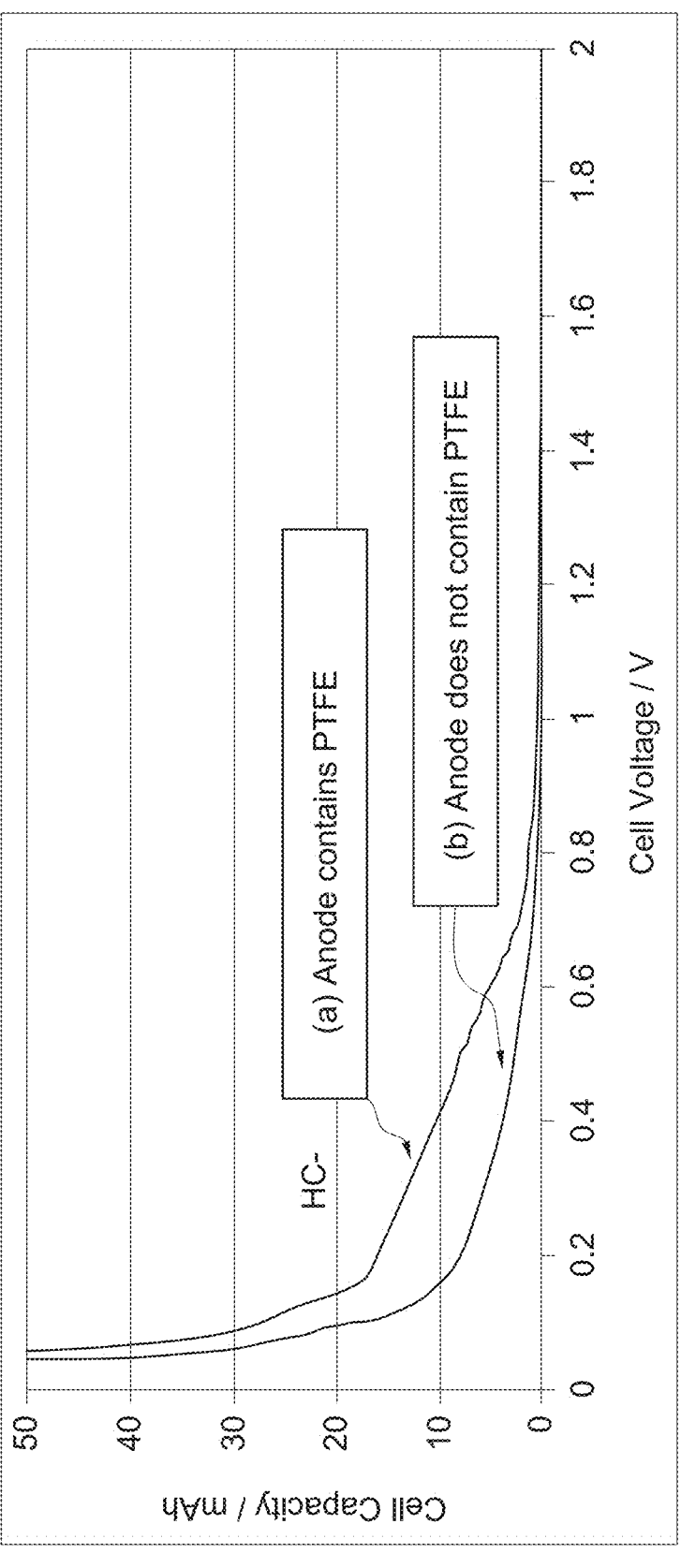
FIG. 3 depicts a lithium half cell showing the presence of a reduction plateau for (a) an electrode including graphite and PTFE, and (b) an electrode including graphite and polyvinylidene difluoride, (PVdF), a non-PTFE binder. The plateau in the PTFE electrode (graph (a)) indicates an additional consumption of charge.

The hypothesized mechanism of decomposition is depicted in FIG. 2.

Figure 4:
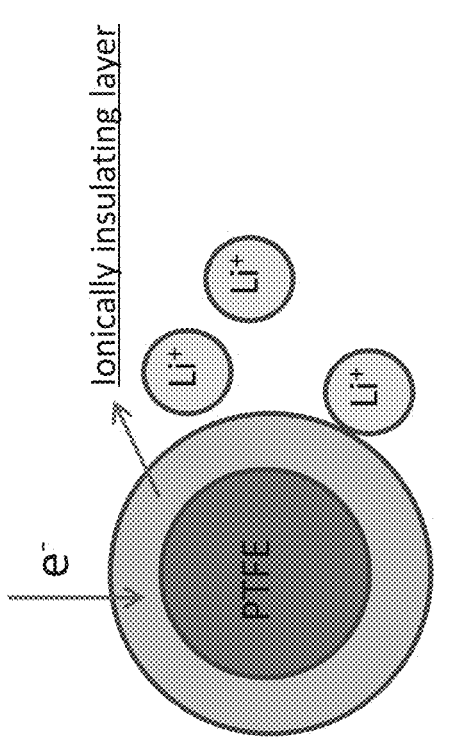
FIG. 4 is a schematic diagram depicting a polytetrafluoroethylene polymer particle coated with an ionically insulating layer according to the Example.

Testing of cells including PTFE-containing reference electrodes demonstrate characteristics consistent with consumption of charge by PTFE binder reduction. As one example, a formation profile of a reference PTFE/graphite half cell was found to include a hump that is believed to correspond to reduction of PTFE. FIG. 4 depicts a graph of reference cell capacity versus cell voltage for lithium half cells (a) an electrode including graphite and PTFE, and (b) an electrode including graphite and polyvinylidene difluoride, (PVdF), a non-PTFE binder. The plateau in the PTFE electrode (graph (a)) indicates an additional consumption of charge relative to the electrode that does not include PTFE. Thus, it is believed that coating PTFE binder particles with a substance that is not conductive of lithium ions, as described herein, may reduce or prevent degradation of the PTFE.

An energy storage device described herein may advantageously be characterized by reduced equivalent series resistance over the life of the device, which may provide a device with increased power density. In some embodiments, energy storage devices described herein may be characterized by reduced loss of capacity over the life of the device. Further improvements that may be realized in various embodiments include improved cycling performance, including improved storage stability during cycling, and reduced capacitance fade.

Coated Binders

Provided herein are compositions and methods for electrode binders. Further provided herein are coated binder particles for use in an energy storage device, wherein the binder particles are coated with a coating material. In some embodiments, a coated electrode binder is provided.

The binder material can comprise a fluorinated binder, for example, polytetrafluoroethylene (PTFE), ultra-high molecular weight polyethylene (UHMWPE), polyvinylidene fluoride/polyvinylidene difluoride (PVDF), a PVDF co-polymer, poly(ethylene oxide) (PEO), or combinations thereof. In some embodiments, the binder is a fibrillizable polymer. In a preferred embodiment, the binder comprises PTFE.

Generally, the coating material is an ionically insulating material, wherein the coating material blocks ions in the electrolyte from making ionic contact with the binder material. Without wishing to be limited by theory, it is thought that lithium ions in an electrolyte of an energy storage device can mediate degradation of polymeric binder materials. Thus, the coating material may be one which blocks electrolyte ions from reaching the binder, thereby limiting (for example, slowing) reaction, for example, reduction of the binder. Preferably the coating material forms an ionically insulating layer on the surface of the binder particles. In some embodiments, the binder particles are insulated from contact with lithium ions. Preferably, the coating covers all or substantially all of the surface of the binder particles, such that contact between the binder particles and the electrolyte is reduced or substantially eliminated. In some embodiments, substantially all of the surface of a binder particle is coated. Coated, or substantially coated, may refer to a coating wherein degradation of PTFE is not an observed failure mode of the energy storage device. However, even coating some of the surface of the binder particles may provide benefit.

The coated binder may comprise coated binder particles. In some embodiments, the coated binder particles may comprise composite particles. The coated binder particles may comprise composite binder particles of conductive carbon and PTFE. Thus, in some embodiments an electrode film mixture may comprise coated binder particles. In further embodiments, an electrode film mixture may comprise composite binder particles.

Without wishing to be limited by theory, several roles for the coating are herein proposed to account for its influence on the electrode performance. It is thought that the coating can act as an electron conductor to enhance electron transport between active particles in the electrode. It is additionally thought that the coating may act as a surface chemistry modifier to improve long term stability and/or binder performance. It is additionally thought that the coating may act as a physical protective layer that may suppress or mitigate failures of one or more components in the cell such as electrolyte breakdown or degradation. It is additionally thought that the coating materials take part in the primary electrode functions of electron transfer and lithium transport.

In further embodiments, an electrode comprising a coated binder particle provided herein is resistant to degradation at a voltage exceeding 0.5 V vs. an Li/Li$^+$ reference potential. In particular embodiments, no degradation of a coated PTFE binder is observed in an electrode film at a voltage exceeding 0.5 V vs. an Li/Li$^+$ reference potential following at least one charge/discharge cycle. In further embodiments, no degradation of a coated PTFE binder is observed in an electrode film at a voltage exceeding 0.5 V vs. an Li/Li$^+$ reference potential following 10, 100, or 500 charge/discharge cycles.

Generally, the coating material is an ionically insulating material. In some embodiments, the coating material is an electrical conductor. In further embodiments, the coating material can comprise a carbon material, for example, carbon black, conductive carbon, graphene-containing carbon, graphite, and combinations thereof. The coating material may be a particulate material, for example, a powdered carbon material. In further embodiments, the coating material can comprise a plurality of carbon materials. In still further embodiments, the coating material can comprise a ductile metal. The ductile metal can be, for example, Cu, Sn or Sb. Preferably, the binder particle comprises PTFE and the coating material comprises conductive carbon. In further embodiments, the conductive carbon comprises graphite, carbon black, graphene, or combinations thereof. In still further embodiments, an electrode of an energy storage device comprises the coated binder particles. In yet further embodiments, the electrode is an anode.

In some embodiments, the coating material does not include any anode active materials. In further embodiments, the coating material does not include graphite.

Generally, the coating will form a physical, adhesive bond to the binder particles. Chemical and/or electrostatic adhesion is thought to be the basis for the bond between the coating and the binder particles. Thus, the adhesion may be due to interface interactions such as swapping and/or sharing of electronic charge(s) and in some cases atoms. Furthermore, it is thought that the charge impacted from one element through mechanical means may create a force that bonds the coating and binder. The strength of the bond may be affected by a number of factors including: surface energy and polarity, surface area covered, surface contamination, surface texture and roughness as well as the cohesive strength of the binder and/or coating.

In various embodiments, the contact between the binder particles and the coating material can be described as sticking or clinging. The contact between binder particle and coating may be due to for example, intermolecular interactions such as ionic forces, polar interactions, induced dipole interactions, London forces, and/or surface forces. The binder may deform and entrap the coating material. Some coating material may be located completely within the binder particles. In some embodiments, the coating material may form a chemical bond to the binder particles. Generally, a coated binder particle can comprise a substantially continuous layer of the coating material around the binder particle. For example, in particular embodiments, the coating material may cover at least about 90%, at least about 95%, or at least about 99% of the surface area of the binder particles. In preferable embodiments, more than 95% of the surface area of the binder particles is coated.

Generally, the coating can have a thickness suitable for ionically insulating a binder particle used in an electrode of an energy storage device. The thickness of the coating can vary over the surface of the binder particle, and can vary between various binder particles. In various embodiments, the thickness of the coating can be about 0.1 microns, about 0.5 microns, about 1 micron, about 2 microns, 5 microns, about 10 microns, about 20 microns, about 50 microns, about 100 microns, or values therebetween. In some embodiments, the thickness is selected to provide an ionically insulating coating such that degradation of the coated binder particles is not a failure mode of an energy storage device. In further embodiments, the thickness is selected to provide an ionically insulating coating such that the electrolyte does not make contact with the binder.

The binder particles and coating material may be combined in a particular mass ratio to achieve one or more of a desired coating thickness or a desired coated surface area of the binder particles. The mass of the coating material may be about 1-50% of the mass of the binder particles, or preferably 5-20%. For coatings with a high surface area, lesser amounts of coating material, for example 1-10% of the mass of the binder particles, and preferably 3-8%, are effective. An example of a high surface area coating material is conductive carbon sold under the Ketjenblack® trademark. Depending on the surface area of the binder particles and coating material, different amounts of coating material may be appropriate. In various embodiments, the mass of the coating material may be about 1%, about 2%, about 3%, about 4%, about 5%, about 6%, about 7%, about 8%, about 10%, about 20%, about 30%, about 40%, or about 50%, or a range between any two of the preceding values, of the mass of the binder particles.

The coating should also be selected for compatibility with a binder fibrillization process. In some embodiments, the application process(es) results in binder particles coated such that a subsequent fibrillization process is unchanged from a fibrillization process effective for fibrillizing uncoated binder particles. In some embodiments, the coated binder particle is initially formed in a dry process and/or used in a dry electrode process to form a dry electrode, such as that described in U.S. Patent Publication No. 2015/0072234 and described further herein. In some embodiments, a dry electrode is provided, wherein the dry electrode is free from processing contaminants such as solvents, and wherein the dry electrode comprises the coated binder particle.

Generally, the coating can be applied to the binder particles by a method provided herein, or by any suitable method. Such methods are known to those of the art and include rolling, grinding, crushing, spraying, stretching, macerating, mixing, whipping, and chopping.

Figure 1:
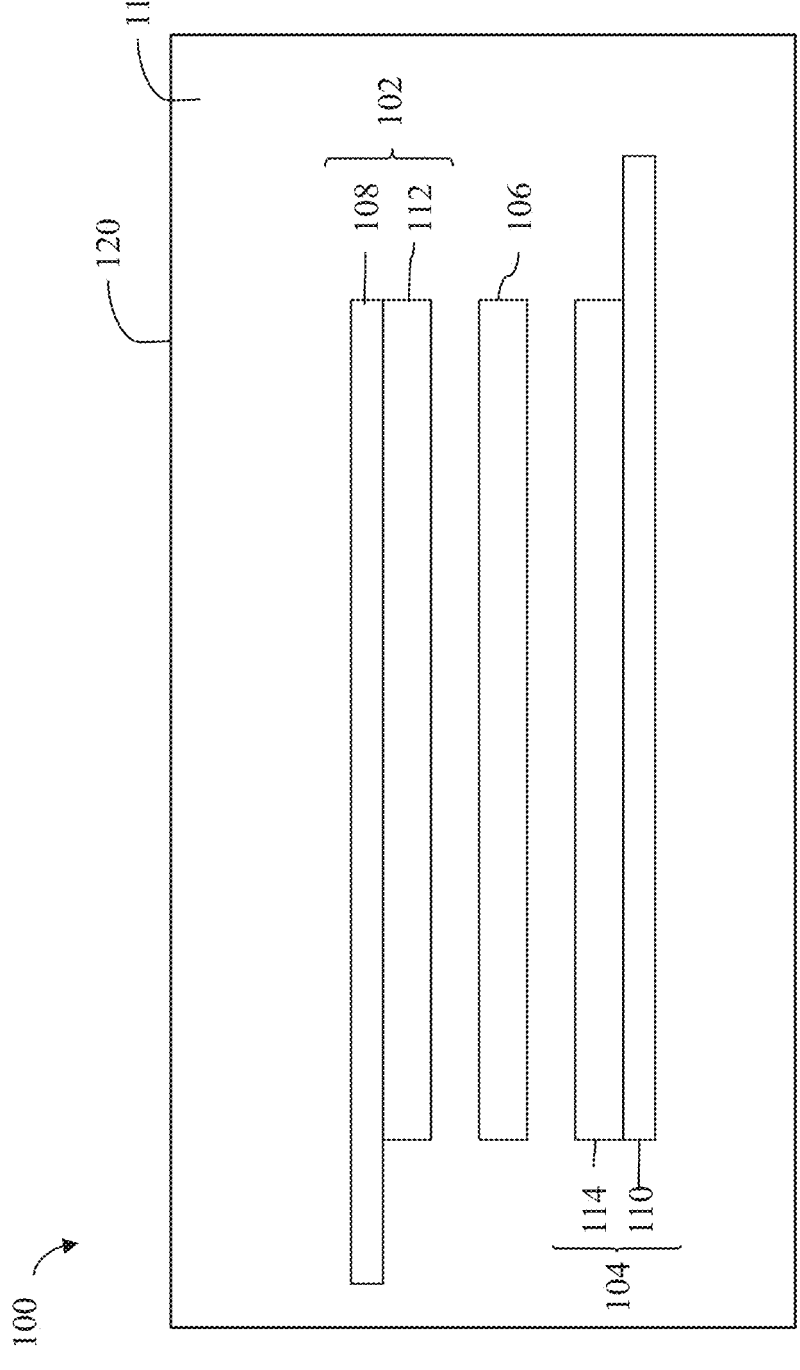
FIG. 1 depicts an embodiment of an energy storage device.

FIG. 1 shows a side cross-sectional schematic view of an example of an energy storage device 100 including an electrode having a coated binder. The energy storage device 100 may be classified as, for example, a capacitor, a battery, a capacitor-battery hybrid, or a fuel cell, depending on the composition of the electrodes 102 and 104.

The device 100 can have a first electrode 102, a second electrode 104, and a separator 106 positioned between the first electrode 102 and second electrode 104, wherein at least one of electrodes 102 and 104 includes a coated binder as provided herein. The first electrode 102 and the second electrode 104 may be placed adjacent to respective opposing surfaces of the separator 106. The energy storage device 100 may include an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 may be received within an energy storage device housing 120. One or more of the first electrode 102, the second electrode 104, and the separator 106, or constituent thereof, may comprise porous material. The pores within the porous material can provide containment for and/or increased surface area for reactivity with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"), or vice versa. In some embodiments, the first electrode 102 may comprise a positive electrode of a lithium ion capacitor. In further embodiments, the second electrode 104 may comprise a negative electrode of a lithium ion capacitor. In some embodiments, the first electrode 102 may comprise a cathode of a lithium ion battery. In further embodiments, the second electrode 104 may comprise an anode of a lithium ion battery. In some embodiments the first electrode 102 and/or the second electrode 104 are free-standing and/or self-supporting dry electrode films.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, respectively, wherein at least one of electrode films 112 and 114 includes a coated binder as provided herein. The electrode films generally comprise one or more porous carbon based materials. In some embodiments, electrode films 112 and 114, can include mixtures comprising binder material and carbon material, wherein at least one of electrode films 112 and 114 includes a coated binder as provided herein.

The carbon based materials may be selected from activated carbon, carbon black, conductive carbon, graphene-containing carbon, graphite, and combinations thereof. Activated carbon can be derived from a steam process or an acid/etching process. In some embodiments, both the first electrode 102 and the second electrode 104 comprise a current collector, one or more porous carbon based materials, and a fibrillated binder. Electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, or values therebetween.

At least one of the first electrode film 112 and the second electrode film 114 will generally include coated binders as provided herein. In some embodiments, the binder can include one or more polymers. In some embodiments, the binder can include one or more fibrillizable binder components. The binder component may be fibrillized to provide a plurality of fibrils, the fibrils desired mechanical support for one or more other components of the film. It is thought that a matrix, lattice, or web of fibrils can be formed to provide mechanical structure to the electrode film. In some embodiments, a binder component can include one or more of a variety of suitable fibrillizable polymeric materials.

In some embodiments, one or more electrode films described herein can be fabricated using a dry fabrication process, for example, as described in U.S. Patent Publication No. 2005/0266298 and U.S. Patent Publication No. 2006/0146479. These, and any other references to extrinsic documents herein, are hereby incorporated by reference in their entirety. As used herein, a dry fabrication process can refer to a process in which no or substantially no solvents are used in the formation of an electrode film. For example, components of the electrode film, including carbon materials and binders, may comprise dry particles. The dry particles for forming the electrode film may be combined to provide a dry particle electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are free-standing and/or self-supporting electrode films formed using the dry process from the dry particle mixture. A process for forming an electrode film can include fibrillizing the fibrillizable binder component such that the electrode film comprises fibrillized binder.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 may facilitate electrical coupling between each corresponding electrode film and an external electrical circuit (not shown). The first current collector 108 and/or the second current collector 110 can comprise one or more electrically conductive materials, and have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise an aluminum foil having a rectangular or substantially rectangular shape sized to provide transfer of electrical charge between the corresponding electrode and an external electrical circuit.

In some embodiments, the energy storage device may be configured to operate at about 2.5 to 4.5 V, or 3.0 to 4.2 V. In further embodiments, the energy storage device is configured to have a minimum operating voltage of about 2.5 V to about 3 V, respectively. In still further embodiments, the energy storage device is configured to have a maximum operating voltage of about 4.1 V to about 4.4 V, respectively. In some embodiments, secondary electrochemical reactions of the electrode and/or electrolyte components are reduced.

In some embodiments, an energy storage device is configured for operation at selected conditions of voltage and temperature. For example, an energy storage device can be configured for operation at 50° C., 55° C., 60° C., 65° C., 70° C., 75° C., 80° C., 85° C., 90° C., 95° C., 100° C., or greater temperatures. An energy storage device can be configured for continual operation at 2.7 V at 60 to 85° C., 2.8 V at 60 to 85° C., 2.9 V at 60 to 85° C., or 3 V at 60 to 85° C., or selected temperature values therebetween. In some embodiments, the conditions of voltage and temperature are about 2.7 V and about 85° C., about 2.8 V and about 80° C., about 2.9 V and about 75° C., about 3 V and about 70° C., or about 3.1 V and about 65° C.

In some embodiments, an energy storage device is configured for an operating voltage of about 2.7 to 3 volts at a temperature of at least about 65° C. for at least 500 k cycles. An energy storage device may include one or more technologies described herein to enable the energy storage device to maintain a capacitance greater than about 80% of its initial capacitance, and/or less than 200% of its initial equivalent series resistance when operating at a voltage of about 2.7 to 3 volts over a period of about 1,500 hours, and/or at least 500 k cycles, and at a temperature of at least about 65° C. In other embodiments, the energy storage device is configured to maintain at least 75%, 85%, 90%, 95% or 99% of its initial capacity when operating for a period of at least 1500 hours, and/or at least 500 k cycles at about 65° C. or greater.

In some embodiments, no significant electrode decomposition occurs in an energy storage device following about 1500 hours of operation and/or at least 500 k cycles, where significance is determined by intervention of an adverse effect requiring operation under less than the rated conditions of the device.

Technologies described herein may be used separately or in combination in an energy storage device to enable operation under the selected conditions.

Lithium Ion Energy Storage Device

In some embodiments, energy storage device 100 can be a lithium ion energy storage device such as a lithium ion capacitor or a lithium ion battery. In some embodiments, the electrode film of a lithium ion energy storage device electrode can comprise one or more carbon materials, and a coated binder particle as provided herein. One or more of the carbon materials may be porous. The porous carbon may be, for example, activated carbon or a conductive carbon. In some embodiments, the porous carbon can include structured carbon nanotubes, structured carbon nanowires, structured carbon nanosheets, graphene sheets, or a combination thereof. In some embodiments, the porous carbon can be a surface treated carbon.

In some embodiments, the electrode film of a lithium ion energy storage device electrode comprises an electrode film mixture comprising carbon configured to reversibly intercalate lithium ions. In some embodiments, the lithium intercalating carbon is graphite, hard carbon, soft carbon, carbon nanotubes, porous carbon, conductive carbon, or a combination thereof. For example, the electrode film of the electrode can include a binder material, one or more of graphite, graphene-containing carbon, hard carbon and soft carbon, and an electrical conductivity promoting material. The electrical conductivity promoting material can be, for example, carbon black or other conductive carbon. The conductive carbon material may be, for example, carbon black such as that manufactured under the trademark Ketjenblack®. In some embodiments, an electrode is pre-doped with lithium ions.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4

M, about 0.5 M, about 0.6 M, about 0.7 M, about 0.8 M. about 0.9 M, about 1 M, about 1.1 M, about 1.2 M, or values therebetween.

In some embodiments, an energy storage device provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise $LiPF_6$, and one or more carbonates.

In some embodiments, an electrode film as provided herein includes at least one active material and at least one binder. The at least one active material can be any active material known in the art. The at least one active material may be a material suitable for use in the anode or cathode of a battery. Anode active materials can be comprised of, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si—SiOx, Sn—SnOx, Si—SiOx-C, Sn—SnOx-C, Si—Sn—C, SiOx-SnOx-C, Si—SiOx-Sn, or Sn—SiOx-SnOx.). In some embodiments, an energy storage device cathode can include a metal oxide. The cathode active material, for example, a metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can be comprised of, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)) or an olivine (such as $LiFePO_4$).

In some embodiments, a cathode electrode film can include about 70 weight % to about 98 weight % of the at least one active material, including about 70 weight % to about 92 weight %, or about 70 weight % to about 96 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise at least one active material, a binder, and optionally a conductive additive. In some embodiments, the conductive additive may comprise a conductive carbon additive, such as carbon black. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the at least one active material, including about 80 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

In some embodiments, the energy storage device 100 is a lithium ion battery. In some embodiments, the lithium ion battery is a lithium-cobalt, lithium-manganese, lithium iron phosphate, lithium nickel manganese cobalt oxide, lithium nickel cobalt aluminum oxide or lithium titanate, or lithium sulfur battery. In some embodiments, the lithium ion battery is configured to operate at about 3 to 4 V, or 3.6 to 3.7 V.

The binder can include polytetrafluoroethylene (PTFE), a polyolefin, polyalkylenes, polyethers, styrene-butadiene, co-polymers of polysiloxanes and polysiloxane, branched polyethers, polyvinylethers, co-polymers thereof, and/or admixtures thereof. The binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the binder comprises a fibrillizable polymer. In certain embodiments, the binder comprises, consists essentially, or consists of PTFE. One or more electrode films may include coated PTFE binder as described herein.

In some embodiments, the binder may comprise PTFE and optionally one or more additional binder components. In some embodiments, the binder may comprise one or more polyolefins and/or co-polymers thereof, and PTFE. In some embodiments, the binder may comprise a PTFE and one or more of a cellulose, a polyolefin, a polyether, a precursor of polyether, a polysiloxane, co-polymers thereof, and/or admixtures thereof. An admixture of polymers may comprise interpenetrating networks of the aforementioned polymers or co-polymers.

The binder may include various suitable ratios of the polymeric components. For example, PTFE can be up to about 98 weight % of the binder, for example, from about 20 weight % to about 95 weight %, about 20 weight % to about 90 weight %, including about 20 weight % to about 80 weight %, about 30 weight % to about 70 weight %, about 30 weight % to about 50 weight %, or about 50 weight % to about 90 weight %.

In some embodiments, the electrode film mixture may include binder particles having selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 μm, about 2 μm, about 3 μm, about 4 μm, about 5 μm, about 10 μm, about 50 μm, about 100 μm, or values therebetween.

As provided herein, an energy storage device can be a capacitor, a lithium ion capacitor (LIC), an ultracapacitor, or a battery. The energy storage device can be characterized by an operating voltage. In some embodiments, an energy storage device described herein can have an operating voltage of about 2.2 V to about 3.8 V. In further embodiments, the operating voltage can be about 2.7 V to about 3 V, about 3.6 to about 3.7 V, or values therebetween.

An energy storage device includes one or more electrodes. An electrode generally includes an electrode film and a current collector. The electrode film can be formed from a mixture of one or more binders and active electrode material. It will be understood that an electrode binder, and an electrode including a binder provided herein, can be used in various embodiments with any of a number of energy storage devices and systems, such as one or more batteries, capacitors, capacitor-battery hybrids, fuel cells, or other energy storage systems or devices, and combinations thereof. In some embodiments, a coated electrode binder, and an electrode including coated binder particles described herein may be a component of a lithium ion capacitor, a lithium ion battery, or an ultracapacitor.

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

In some embodiments, energy storage device 100 is an ultracapacitor configured to operate at about 2.7 V, 2.8 V, 2.9 V, 3 V, or greater than 3 V.

In some embodiments, the lithium ion capacitor includes one or more lithium ion intercalating components, as described in U.S. Patent Publication No. 2015/0287546.

In some embodiments, the ultracapacitor includes a positive electrode or a negative electrode comprising a treated carbon material, where the treated carbon material includes a reduction in a number of hydrogen-containing functional groups, nitrogen-containing functional groups and/or oxygen-containing functional groups, as described in U.S. Patent Publication No. 2014/0098464. In further embodiments, the ultracapacitor includes an electrolyte comprising a quaternary ammonium salt with a concentration of less than one molar, as described in U.S. Patent Publication No. 2014/0104752. In still further embodiments, the ultracapacitor includes a protective coating disposed on an inner housing surface, as described in U.S. Patent Publication No. 2014/0098463. In yet further embodiments, the ultracapacitor includes a positive electrode or a negative electrode comprising a carbon based layer having a selected porosity, for example, mesoporosity or microporosity, as described in U.S. Patent Publication No. 2014/0098465. In some embodiments, the ultracapacitor includes electrolyte in an amount that is selected to correspond to the saturation quantity of components of the ultracapacitor as described in U.S. Patent Publication No. 2014/0368973.

Definitions

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

As provided herein, a "solvent-free" electrode film is an electrode film that contains no detectable processing solvents, processing solvent residues, or processing solvent impurities. A dry electrode film, such as a cathode electrode film or an anode electrode film, may be solvent-free.

A "wet" electrode, "wet process" electrode, or slurry electrode, is an electrode prepared by at least one step involving a slurry of active material(s), binder(s), and optionally additive(s). A wet electrode may include processing solvents, processing solvent residues, and/or processing solvent impurities.

Methods

In some embodiments, a method for constructing an energy storage device is provided. In further embodiments, the method comprises selecting a binder material, selecting a coating material, coating the binder particles, optionally, fibrillating the coated binder particles and an electrode active material to form an electrode composition, and optionally applying the electrode composition to a current collector to form an electrode.

Figure 6:
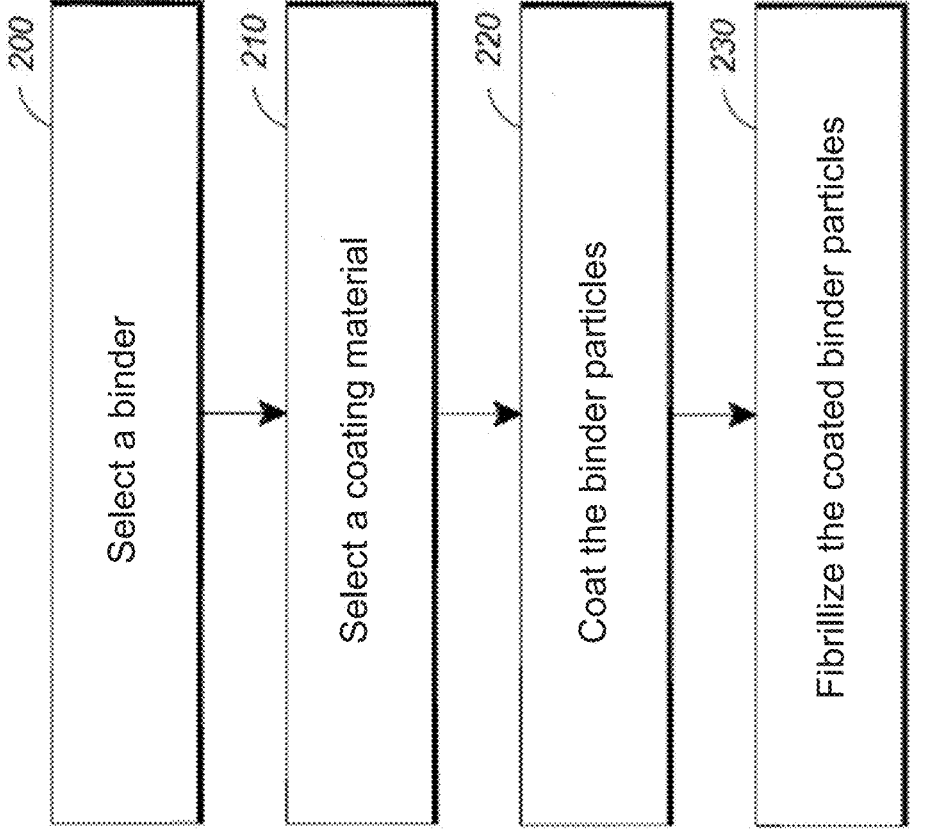
FIG. 6 depicts a flowchart for a method for coating binder particles in an embodiment.

FIG. 6 depicts an embodiment of a method for coating binder particles as raw material to be used in an electrode film for an energy storage device. In step 200, select a binder, a suitable binder is selected. The binder selected may be a binder as described herein. In some embodiments, the binder selected comprises a fluorinated polymer. In further embodiments, the binder is selected from polytetrafluoroethylene (PTFE), ultra-high molecular weight polyethylene (UHMWPE), polyvinylidene fluoride (PVDF), a PVDF co-polymer, poly(ethylene oxide) (PEO), or combinations thereof. In some embodiments, the binder selected is a single binder. In some embodiments, the binder is dry. In some embodiments, the binder is in powder form.

In some embodiments, the binder selected is a fibrillizable binder, wherein the fibrillizable binder is as provided herein. In preferable embodiments, the binder selected is PTFE. In certain embodiments, the binder consists of or consists essentially of PTFE or any one of the aforementioned binder materials.

In step 210, select a coating material, a suitable coating material is selected. Generally, the coating material is an ionic insulator. In some embodiments, the coating material is an electrical conductor. In further embodiments, the coating material can comprise a carbon material, for example, carbon black, conductive carbon, graphene-containing carbon, graphite, and combinations thereof. In yet further embodiments, the coating material can comprise a plurality of carbon materials. In still further embodiments, the coating material can comprise a ductile metal. The ductile metal can be, for example, Cu, Sn or Sb. Preferably, the coating material comprises conductive carbon. The conductive carbon can be, for example, a commercial carbon such as Super P, Acetylene black (AB), Shwanigan, black (SB), and a number of other carbons compatible with battery operation. In some embodiments, other conductive materials, including metals, semi-metals and semi-conductors may be suitable. In some embodiments, the coating material consists of or consists essentially of conductive carbon, or any one of the aforementioned coating materials.

The coating material should be in a suitable form for application to the binder particles. The coating material can be dry. The coating material may change form during processing such that appropriate coated binder particles result. Generally, the coating material can be in powder form, however, other forms are contemplated, for example, flakes. In certain embodiments, the coating material may be amorphous prior to processing.

In step 220, coat the binder particles, the coating material is applied to the surface of the binder particles. The coating material can be applied to the binder particles by any suitable method or methods. Some, most, or substantially all of the surface of a binder particle can be coated. Generally, substantially all of the surface of a binder particle is coated following the application process or processes. The thickness of the coating can be selected for a particular application, and can be a thickness provided herein. Preferably, the binder particles are completely coated with the coating material following the application process(es). In some embodiments, substantially all of the surface of a binder particle is coated following the application process(es). In some embodiments, 80 to 90% of the binder particle surface is coated. For example, in particular embodiments, 70%, 80%, 90%, 95%, or 99%, or a range between two of these values, of the surface area of the binder particles is coated. Preferably the coating material forms an ionically insulating layer on the surface of the binder particles. In preferable embodiments, more than 95% of the surface area of the binder particles is coated. In some embodiments, the binder particles are insulated from passage by lithium ions.

Step 220 may comprise steps of combining and mixing the binder particles and the coating material. Combining may comprise combining binder particles and coating material in a particular mass ratio. Generally, the amount of coating material used for a particular amount of binder particles can be such that substantially all of the coating material coats the surface of the binder particles. Mixing may comprise mechanical fusion and/or milling as described below. Mixing may be carried out under conditions that do not fibrillize the binder particles. The combining and mixing steps may be started, performed, or completed sequentially or concurrently. In some embodiments, the combining and mixing steps are performed in a single apparatus. In some embodiments, combining and/or mixing can include processing materials that consist essentially of or consist of the binder particles and the coating material. In further embodiments, the binder particles combined and/or mixed consist essentially or consist of PTFE, and the coating material combined and/or mixed consists essentially or consists of conductive carbon. The mass of the coating material may be about 1-50% of the mass of the binder particles, or preferably 5-20%. For coatings with a high surface area, lesser amounts of coating material, for example 1-10% of the mass of the binder particles, and preferably 3-8%, are effective. An example of a high surface area coating material is conductive carbon sold under the Ketjenblack® trademark. Depending on the surface area of the binder particles and coating material, different amounts of coating material may be appropriate.

The coating step can comprise a mechanical fusion step, wherein the surface of a binder particle is coated with the coating material to provide a coated binder particle as provided herein. Generally, the mechanical fusion step will be any combining process sufficient to adhere the chosen coating material to the binder. Generally, the mechanical fusion is accomplished by imparting mechanical energy to the binder and coating materials. Without wishing to be limited by theory, it is thought that the mechanical energy may lead to chemical reactions between binder and coating particles. In some embodiments, the mechanical fusion can comprise a lower-velocity milling or other tumbling process with lower velocities than would be sufficient to fibrillize a binder, for example, jet milling or other high-velocity blending. Generally, high shear milling, or high velocity milling, refers to milling conducted at sufficient velocities to fibrillize PTFE or another fibrillizable binder.

The coating process may include either or both mixing and milling steps. The mixing and/or milling steps may be performed in a milling apparatus including media. The media may be fixed or free. Either or both of the mixing and milling may be conducted in an inert atmosphere, for example, comprising nitrogen or argon. The coating process may be a dry process conducted in the absence of solvents or other additives.

Figure 7:
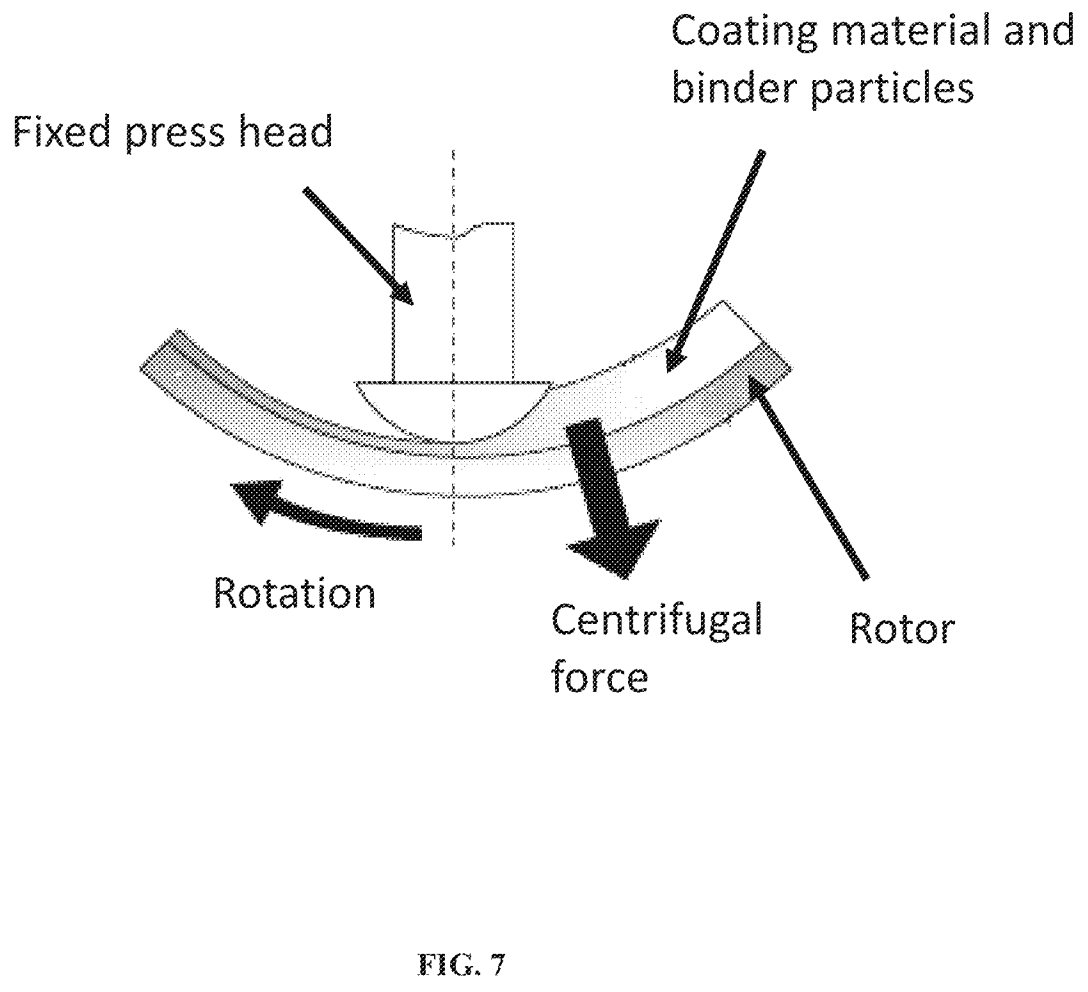

In certain embodiments, the coating process may include a mixing step. The mixing step may comprise a mechanical fusion performed in a mixing apparatus having a fixed media, such as a fixed press element. FIG. 7 depicts a mixing apparatus having a fixed press element. As a specific example, the mixing apparatus may be a MECHANO FUSION™ system of Hosokawa Micron Corp., Japan. In such embodiments, feed material comprising coating material and binder particles is charged into a rotor with a fixed press head. Thus, compressive forces are applied to the mixture of binder and coating materials while a rotor presses the mixture against the rotor wall by centrifugal force. Multiple compression cycles may be used.

Figures 8A, 8B, 8C:
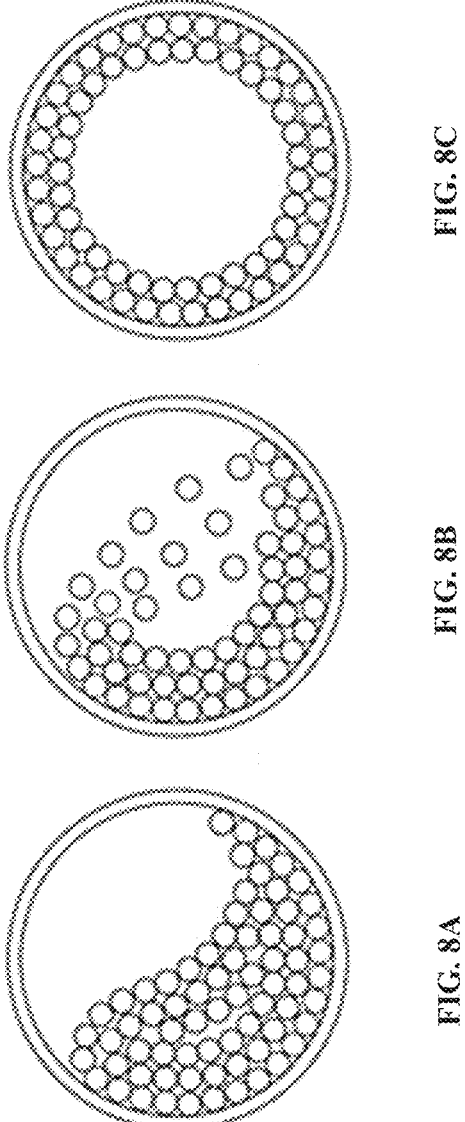
FIGS. 8A-8C depict cross sections of a roller mill including ball shaped media at various rotational speeds that may be used in coating binder particles in an embodiment.

In some embodiments, a milling process can be performed to ensure that the coated binder particles have a sufficient surface coating, for example, to create a coating covering at least about 70%, at least about 80%, at least about 90%, at least about 95%, or at least about 99% of the surface of the binder particles. In preferable embodiments, more than 95% of the surface area of the binder particles is coated. For example, the coating process may include a milling step performed by processing the binder and coating particles in a jar roller mill. The roller may be, for example, a one-tier jar mill. In some embodiments, the jar mill be a high-capacity laboratory jar mill including a 13" roller, and operating at 115 VAC/60 Hz A specific example is a U.S. Stoneware jar variable speed roller mill, Model 755RMV1. A Jar-Roller mill generally includes a ceramic jar pre-loaded with the feed materials and media, which is placed on two rotating rollers. The speed of rotation can be varied, any can be, for example, from 5 to 200 rpm. Where blending only is desired (no attrition or size reduction effects), it is preferable to use lower rpm, below 100 and preferably below 50 rpm. In some embodiments, such as that discussed with reference to the Example below, an additional media can be included within the mill during the coating step, to improve the efficiency of the coating process. The media can be separated from the coated binder material, upon completion of the coating step, to allow the coated binder to be further processed into an electrode film. The media can comprise any of a number of materials that are inert relative to the binder and coating. The media can be configured as a plurality of balls, beads, cylinders, or any of a number of different regular or irregular shapes. The media can be any of a number of different sizes, but is generally significantly larger than the binder and coating material. Typical sizes of the media may be 0.1 mm to about 30 mm in diameter for spherical media, and 5 mm to 20 mm in diameter for cylindrical media. In preferable embodiments, the media is a cylindrical media having a length of about 0.5 cm to 1.5 cm. FIGS. 8A-8C depict cross sections of a jar roller mill including ball shaped media at various rotational speeds, with polymeric binder materials and coating materials.

In some embodiments, the application process(es) results in binder particles coated such that a subsequent fibrillization process is unchanged from a fibrillization process for uncoated binder particles. In some embodiments, the coating process provides a reduction of the electrostatic attractive forces between binder particles. In further embodiments, the coating process(es) result in binder particles having no tendency to agglomerate, or a decreased tendency to agglomerate relative to uncoated binder mixed with carbon or other materials used in electrode film formation. The coated binder particles may appear as those depicted in FIG. 5. The binder particles in FIG. 5 do not display the original (off white) color of the binder particles, and appear black to the naked eye.

Optionally, in step 230, fibrillize the coated binder particles, the coated binder particles and electrode active materials are fibrillized, for example, by jet milling. Persons of skill in the art have the knowledge to perform such a fibrillizing process. Such processes are discussed in, for example, U.S. Patent Publication No. 2015/0072234.

In some embodiments, a milling apparatus is provided. The milling apparatus may include a media, binder particles and a coating material. The media may be a fixed media, such as a press tip or element, or a moveable media, such as balls. The milling apparatus may include a container forming an inner volume, and a media. The inner volume may further contain binder particles and a coating material. The media and container may be configured to move relative to each other to coat the binder particles with the coating material to form coated binder particles. The media may be a fixed media or a moveable media. For example, in some embodiments, the media may be a fixed press head adjacent to a rotor as depicted in FIG. 7. The milling apparatus may be configured to carry out one or more steps of the method of FIG. 6.

In further embodiments, the media may be ball media. The apparatus may be configured for rotation of the inner volume. For example, when ball media are contained in the inner volume, rotation of the inner volume may lead to various modes of milling, as depicted in FIGS. 8A-8C. FIG. 8A depicts a roller mill including ball media operating well below critical speed and below a speed at which cascading of media occurs. FIG. 8B depicts a roller mill operating at a speed above which cascading occurs. FIG. 8C depicts a roller mill including ball media operating above critical speed.

EXAMPLE

Figure 5:
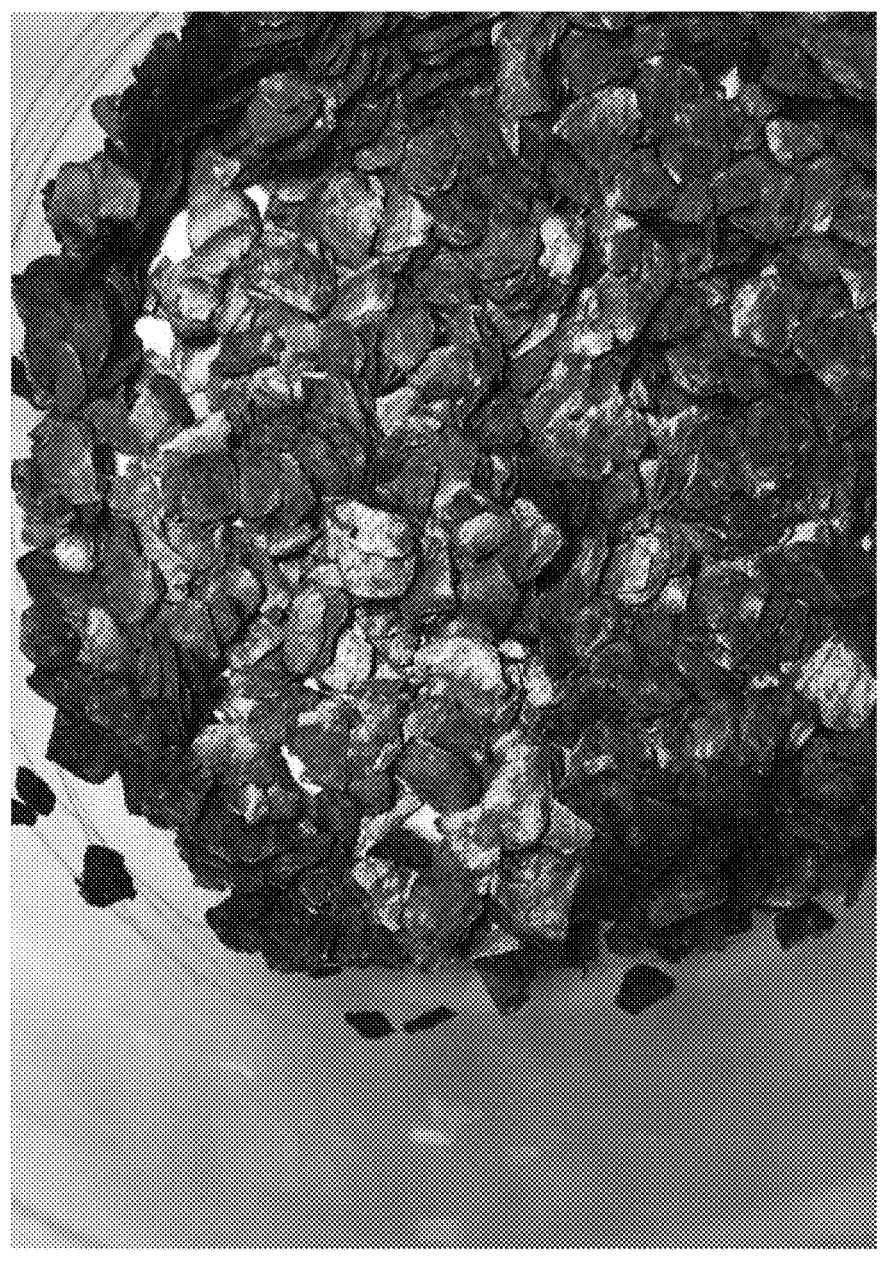
FIG. 5 is a photograph depicting coated binder particles according to the Example.

PTFE binder powder was coated with a conductive carbon including graphite and carbon black (Super P®) using a Jar roller mill. The Jar roller mill used zirconia media (½ in diameter) to facilitate the coating process, by smearing the carbon particles on the white PTFE binder particles. The coated binder particles are depicted in FIG. 5. Following coating, the white color of the binder particles was no longer visible, and the agglomerating properties of the PTFE particles to each other was eliminated. The coated PTFE binder particles had a flake shape of approximately 2 to 3 mm in the longest dimension.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An electrode film comprising:
active material particles; and
fibrillized polymeric binder particles coated with a coating material;
wherein the coating material is ionically insulating and electrically conductive;
wherein the fibrillized polymeric binder particles form a matrix within the electrode film such that the electrode film is self-supporting; and
wherein at least about 70% of an average surface of the fibrillized polymeric binder particles are coated with the coating material.

2. The electrode film of claim 1, wherein the fibrillized polymeric binder particles comprise a binder selected from the group consisting of polytetrafluoroethylene (PTFE), ultra-high molecular weight polyethylene (UHMWPE), polyvinylidene fluoride (PVDF), a PVDF co-polymer, poly (ethylene oxide) (PEO), and combinations thereof.

3. The electrode film of claim 1, wherein the active material particles comprise a material selected from the group consisting of graphite, hard carbon, soft carbon, graphene, mesoporous carbon, silicon, a silicon oxide, tin, a tin oxide, germanium, lithium titanate, combinations thereof, and composites thereof.

4. The electrode film of claim 1, wherein the fibrillized polymeric binder particles form composite particles with the coating material.

5. The electrode film of claim 4, wherein the fibrillized polymeric binder particles comprise composite particles of PTFE and conductive carbon.

6. The electrode film of claim 1, wherein the coating material comprises a material selected from the group consisting of carbon black, conductive carbon, graphene-containing carbon, graphite, and combinations thereof.

7. The electrode film of claim 1, wherein the coating material further comprises a ductile metal.

8. The electrode film of claim 7, wherein the ductile metal is selected from the group consisting of Cu, Sn, Sb, and combinations thereof.

9. The electrode film of claim 1, wherein the coating material comprises conductive carbon.

10. The electrode film of claim 1, wherein at least about 90% of the average surface of the fibrillized polymeric binder particles are coated with the coating material.

11. The electrode film of claim 1, wherein about 80% to 90% of an average surface of the fibrillized polymeric binder particles are coated with the coating material.

12. The electrode film of claim 1, wherein the electrode film is substantially free from solvent residue.

13. The electrode film of claim 1, wherein the total mass of the coating material is about 1-50% the total mass of the fibrillized polymeric binder particles.

14. The electrode film of claim 1, wherein the thickness of the coating material coated on the fibrillized polymeric binder particles is about 0.1-100 microns.

15. An electrode, comprising the electrode film of claim 1 and a current collector.

16. An energy storage device comprising the electrode of claim 15.

17. The energy storage device of claim 16, further comprising an electrolyte comprising lithium ions in contact with the electrode film.

18. The energy storage device of claim 17, wherein the fibrillized polymeric binder particles are insulated from contact with the lithium ions.

19. The energy storage device of claim 16, wherein the energy storage device is a battery.

20. The energy storage device of claim 16, wherein the energy storage device is configured to maintain at least 75% of its initial capacity when operating for a period of at least 1500 hours at about 65° C. or greater.

21. An electrode film comprising:

active material particles; and fibrillized polymeric binder particles coated with a coating material;

wherein the coating material is ionically insulating and electrically conductive;

wherein the fibrillized polymeric binder particles form a matrix within the electrode film such that the electrode film is self-supporting; and wherein the total mass of the coating material is about 1-50% the total mass of the fibrillized polymeric binder particles.

22. An electrode film comprising:

active material particles; and fibrillized polymeric binder particles coated with a coating material;

wherein the coating material is ionically insulating and electrically conductive;

wherein the fibrillized polymeric binder particles form a matrix within the electrode film such that the electrode film is self-supporting; and wherein the thickness of the coating material coated on the fibrillized polymeric binder particles is about 0.1-100 microns.

* * * * *